United States Patent
Bjorkengren et al.

(10) Patent No.: US 9,177,112 B2
(45) Date of Patent: Nov. 3, 2015

(54) METHOD AND DEVICE FOR COMMUNICATING DIGITAL CONTENT

(75) Inventors: Ulf Bjorkengren, Bjarred (SE); Daniel Cantrein, Wurselen (DE); Yi Cheng, Sundbyberg (SE); Frank Hartung, Herzogenrath (DE)

(73) Assignee: ST-ERICSSON SA, Plan-Les-Ouates (CH)

( * ) Notice: Subject to any disclaimer, the term of this patent is extended or adjusted under 35 U.S.C. 154(b) by 277 days.

(21) Appl. No.: 13/695,476

(22) PCT Filed: May 11, 2011

(86) PCT No.: PCT/EP2011/057595
§ 371 (c)(1),
(2), (4) Date: Oct. 31, 2012

(87) PCT Pub. No.: WO2011/144510
PCT Pub. Date: Nov. 24, 2011

(65) Prior Publication Data
US 2013/0047264 A1 Feb. 21, 2013

Related U.S. Application Data

(60) Provisional application No. 61/347,610, filed on May 24, 2010.

(30) Foreign Application Priority Data

May 17, 2010 (EP) .................................... 10162949

(51) Int. Cl.
*H04L 29/06* (2006.01)
*G06F 21/00* (2013.01)
(Continued)

(52) U.S. Cl.
CPC ............... *G06F 21/00* (2013.01); *G06F 21/10* (2013.01); *G06F 21/105* (2013.01);
(Continued)

(58) Field of Classification Search
None
See application file for complete search history.

(56) References Cited

U.S. PATENT DOCUMENTS

2004/0064714 A1 * 4/2004 Carr ............................... 713/193
2004/0103303 A1 * 5/2004 Yamauchi et al. ............ 713/200
(Continued)

FOREIGN PATENT DOCUMENTS

EP    2 003 585 A2    12/2008

OTHER PUBLICATIONS

International Search Report issued in corresponding International application No. PCT/EP2011/057595, mailing date Jun. 22, 2011.
(Continued)

*Primary Examiner* — Shin-Hon Chen
(74) *Attorney, Agent, or Firm* — Patent Portfolio Builders PLLC (57) ABSTRACT

A method for establishing a secured communication channel, between a first processing component and a second processing component; the method comprising executing a digital rights management agent on a processing unit, the digital rights management agent being configured to enforce permissions associated with digital content based on a digital rights management protection mechanism; receiving, by the digital rights management agent at least a security data item, the security data item including a session key data item; verifying authenticity of the received session key data item by the digital rights management agent using said digital rights management protection mechanism; providing the verified session key data item by the digital rights management agent to at least the second processing component; establishing a secured communication channel between the first and second processing components using at least the provided session key data item.

20 Claims, 4 Drawing Sheets (51) Int. Cl.
*G06F 21/10* (2013.01)
*G06F 7/04* (2006.01)
*G06F 17/30* (2006.01)
*H04N 7/16* (2011.01)

(52) U.S. Cl.
CPC .............. *G06F 2221/0706* (2013.01); *G06F 2221/0717* (2013.01); *G06F 2221/0728* (2013.01); *G06F 2221/0791* (2013.01)

(56) References Cited

U.S. PATENT DOCUMENTS

| | | | |
|---|---|---|---|
| 2004/0103312 A1* | 5/2004 | Messerges et al. | 713/201 |
| 2006/0021068 A1* | 1/2006 | Xu et al. | 726/30 |
| 2007/0232269 A1* | 10/2007 | Jung et al. | 455/411 |
| 2008/0178001 A1* | 7/2008 | Kim et al. | 713/167 |
| 2008/0313264 A1* | 12/2008 | Pestoni | 709/202 |
| 2008/0320533 A1* | 12/2008 | Kitazato | 725/98 |
| 2009/0180617 A1* | 7/2009 | Peterka | 380/277 |
| 2009/0198993 A1* | 8/2009 | Kim | 713/150 |
| 2009/0210698 A1* | 8/2009 | Candelore | 713/153 |
| 2009/0217036 A1* | 8/2009 | Irwin et al. | 713/168 |
| 2011/0239287 A1* | 9/2011 | Pak et al. | 726/10 |

OTHER PUBLICATIONS

Cacheflow, "SSL Primer", CacheFlow Technical Note, XX, XX, Oct. 31, 2000, pp. 1-16, XP002278809.

* cited by examiner

METHOD AND DEVICE FOR COMMUNICATING DIGITAL CONTENT

TECHNICAL FIELD

Disclosed herein are a method, product means, and a device for establishing a secure communications channel.

BACKGROUND

In many situations it is desirable to protect digital content against unauthorised access. Encryption of data is a widely used method for achieving such a protection. There is a large variety of known encryption methods providing different degrees of protection against attacks by unauthorised users targeted at breaking the encryption and getting access to the data.

Digital Rights Management (DRM) refers to a range of access control technologies that can be used by hardware manufacturers, publishers, copyright holders and individuals to impose limitations on the usage of digital content and devices. The term is used to describe any technology which controls uses of digital content and, in particular, restricts uses that were not desired or foreseen by the content provider.

A DRM agent is a trusted entity in a processing device, such as a mobile terminal, responsible for enforcing permissions and constraints associated with digital content managed by a DRM system, as well as controlling access to the digital content. The DRM agent is typically launched when protected digital content is received by the device, and it extracts and decrypts the digital content. The DRM agent does normally not decrypt protected content at the point when it arrives to the processing device, as unprotected content must normally not be stored on the processing device. Instead, content is normally decrypted chunk by chunk upon request from a rendering unit (e.g. upon media player requests) and conditioned on applicable permissions and/or constraints.

The DRM agent is consulted for permissions and constraints before the content is passed to a media player or other processing device or program for processing the digital content, e.g. an image viewer, video player, etc.

In a DRM system, it is often desirable to communicate data between two nodes such that the data is protected against interception and tampering.

For example, in home networks a residential gateway is typically the terminating node in communication sessions involving download and rendering of protected content. To enable rendering on other devices in the home network that may not necessarily include complete DRM support, the protected content which is decrypted by the DRM agent in the gateway needs to be securely transmitted to the device.

More generally, the DRM agent may need to involve rendering resources that it can not by default treat as trusted, including cases where these resources are located both in the same device as the DRM agent and cases where these resources are located in another device than the DRM agent.

So-called Secure Authenticated Channels (SAC) are used to transfer data protected against interception and tampering between two nodes. A common method to create a secure channel is for the two nodes to create and share a common secret session key that can be used for encrypting the data sent over the channel. Several options are available for securely establishing this session key. Cryptographic protocols like the Diffie-Hellman key exchange can be used, or if the nodes belong to a Public Key Infrastructure (PKI) system (also referred to as PKI ecosystem), this may be used for a secure key exchange. For the two nodes to authenticate each other, either a PKI ecosystem is required, or the two nodes must share a common pre-loaded secret key (or password).

For two nodes to achieve mutual authentication and establishment of a secure channel, either a PKI ecosystem is needed, or preloaded shared secrets must be available in the nodes.

PKI ecosystems require a substantial investment to be established, and the computational burden on the nodes for running the required algorithms is quite high. Only few usable large-scale PKI systems are in place. Some of them are connected to PKI-based DRM system, for example the PKI system established by CMLA (Content Management License Administrator), for use in OMA DRM standards compliant servers and devices. However, these systems are not foreseen to be used for general SAC establishment, and per se do not support such general functionality.

Preloaded shared secrets require that the nodes have securely received the secret at some point before the secure transfer is to take place. In scenarios where larger numbers of nodes shall support a SAC establishment, one possible solution is to provision the shared secret during the production process of the nodes. This means that the "SAC ecosystems" that the node should support must be known at production time, which reduces the flexibility in what SAC ecosystems a node can participate. Therefore, pre-shared keys (e.g. as used in TLS-PSK) are often used in enterprise applications and systems, but not commonly in CE devices or systems.

SUMMARY

Disclosed herein are a method and a processing device for establishing a secured communication channel between a first processing component and a second processing component; the method comprising:

executing a digital rights management agent on a processing unit, the digital rights management agent being configured to enforce permissions and/or constraints associated with digital content based on a digital rights management protection mechanism;

receiving, by the digital rights management agent at least a security data item, the security data item including a session key data item.

verifying authenticity of the received session key data item by the digital rights management agent using said digital rights management protection mechanism;

providing the verified session key data item by the digital rights management agent to at least the second processing component;

establishing a secured communication channel between the first and second processing components using at least the provided session key data item.

Embodiments of the method and device described herein may thus use established DRM infrastructure to transport a SAC session key and/or or a session seed for generating a session key, and optionally information about how to use it for setting up the SAC, to the DRM agent. The method may be implemented by a specifically adapted DRM agent to be able to use this data for setting up the SAC; however, the thus modified DRM agent may still comply with existing DRM system specifications. In some embodiments, implementation of the method may not even require modification of a DRM agent, e.g. when the tasks are suitably partitioned between the DRM agent and the SAC processing component.

The secured communications channel may be secured by any suitable cryptographic mechanism for ensuring, based on a shared, secret session key authenticity and/or integrity and/or confidentiality of the data communicated via the secured communications channel. The secured communications channel may be a secure authenticated channel (SAC).

The first and second processing components may each be a software component, a hardware component, or a processing component implemented as a combination of software and hardware. The digital rights management agent may include the second processing component or the digital rights management agent may be connected to the second processing component via a trusted interface. For example, the digital rights management agent and the second processing component may be implemented as an integrated software component or as two separate software components executed by the same processing device. For the purpose of the present description the first and second processing components will also be referred to as nodes between which the secured communications channel is to be established. The first and second processing components and the digital rights management agent may be implemented (e.g. as executable software components) on different processing devices; alternatively, some or all of the first and second processing components and the digital rights management agent may be implemented on the same processing device.

Hence, the method described herein may be used to establish a secure communications channel between the DRM agent and a first processing component. However, the method may also be used in situations where the DRM agent is not one of the communicating nodes in the SAC session. If the DRM agent can authenticate and trust an entity by some other means, then this entity could be authorised to execute the SAC session by being provisioned with the information required to setup and use the SAC.

Accordingly, the DRM agent may be executed on a processing unit included in, or associated with, the second processing component. For example, when the second processing component is a software entity, the DRM agent may be executed by the same processing unit that also executes the second processing component, or by a processing unit that is in communicative connection with the processing unit that executes the second processing component. The second processing component may even be included in the DRM agent, or the DRM agent may be included in the second processing component. When the second processing component is a hardware entity, the DRM agent may be executed by the second processing component, or on a processing unit in communicative connection with the second processing component. Accordingly, the verified session key data item may be provided by the digital rights management agent to at least the second processing component in a number of ways, e.g. by communicating the verified session key data item from the DRM agent to the second processing component. The term providing the verified session key data item by the digital rights management agent to at least the second processing component is also intended to include other mechanisms for making the verified session key data item available to the second processing component, e.g. by including the second processing component in the DRM agent.

The digital rights management protection mechanism may be any suitable mechanism for enforcing permissions associated with digital contents. For example, the digital rights management agent may utilise a public key infrastructure. In one embodiment, the DRM agent has associated with it a unique private/public key pair and a certificate. The certificate may include additional information, such as maker, device, type, software version, serial number(s), and/or the like. This allows a content provider and/or a rights issuer to securely authenticate the DRM agent. The DRM agent may be provisioned with a unique private key and an associated certificate identifying the DRM agent and certifying the binding between the agent and the key pair. This allows a rights issuer to securely authenticate the DRM agent using a standard PKI procedure. Hence, verifying authenticity of the received session key data item may include decrypting the session key data item. Alternatively or additionally, the verification step may include obtaining and verifying a license data item associated with the digital content. In such embodiments, the license data item may include an encrypted key which is decrypted using a device private key. This key may then be used for decryption of the session key data item, provided that permission/constraints allow it.

The security data item including the session key data item may be included in a container data item for communicating digital content, e.g. as DRM metadata or in another suitable way, e.g. as a digital watermark, or otherwise embedded in the digital content. Hence the container data item for communicating digital content may include the digital content to be processed and DRM metadata different from the digital content. The term DRM metadata is intended to refer to data carrying information about the digital content, e.g. data about an electronic file such as a digital image, digital photo, document, program file, database table etc. This information is thus not embedded in the digital content, e.g. in the played audio or video data, like a watermark, but is kept separate, but within the received container data item for communicating digital content, e.g. the received file or stream. By transporting the security data item (including the session key data item) as DRM metadata, which many DRM systems provide means for, existing DRM systems can be used without having to be changed or at least with minimal changes, e.g. by defining new types of metadata. For example, the OMA DRM V2.0 standard provides a mechanism that may be used to transport the required data in the metadata fields. The Common Headers Box contains the field Textual headers. Custom headers may there be defined as additional headers to be inserted as arbitrary name value pairs. Devices that do not recognise these headers may thus ignore them.

In some embodiments, the container data item for communicating digital content only includes the security data item but not the digital content to be communicated over the SAC, i.e. the data to be transported over the SAC is not coupled to the DRM content. Metadata is typically not encrypted, and hence typically not used for carrying confidential data. However, metadata is typically included in the data that is digitally signed. So metadata is typically integrity protected, but not confidential. However, in at least one embodiment of the method described herein, encrypted data is transported as metadata.

The session key data item may include a session key and/or a seed data item from which the first and/or the second processing component generates the session key. The security data item may further include information about how to set up the secure communications channel. In an embodiment, where the session key data item only includes one or more seed data items, at least one of the seed data items may be transported to the DRM agent in encrypted format. After decryption, this seed may be forwarded to a SAC node over a secure channel, e.g. to a node in the same device as the DRM agent.

The other node involved in the SAC establishment, i.e. the first processing component, may obtain its copy of the session key by some other method, e.g. by being provisioned at the time of production of that entity, at some time after production by any secure provision mechanism, or also by a DRM agent executed on the first processing component or, if the first processing component is implemented as a software component, on the same processing device as the first processing component, or by generating the session key by the first processing component as will be described in the following.

In some embodiments the security data item further comprises a session seed data item allowing the first processing component to generate a session key corresponding to the received and verified session key (or the session key generated from a received and verified session key data item), and the method comprises communicating the session seed to the first processing component. The first processing component may then generate the session key, and the establishment of the secured communications channel may be based on the verified session key provided to the second processing component and the generated session key generated by the first processing component. The session key generated by the first processing component may (or must in some embodiments) be equal to the session key provided to the second processing component. Hence, a solution is provided for how the first processing component may obtain the setup data without the presence of a trusted interface. The same DRM metadata channel that is used by the DRM agent may thus be used to provision a seed data item that is used by the other node to synthesize the session key. The first processing component may have been provisioned at an earlier point in time (e.g. at production time) with a functionality for generating a session key from a seed. This allows every session to use a unique key, but for every session using the same initially provisioned functionality in this node.

In some embodiments, the container data item for communicating digital content comprises digital content encrypted by a content encryption key, and the security data item including the session key data item encrypted by the content encryption key.

In some embodiments, the security data item comprises some or all of the following:
- a session key, e.g. encrypted by the Content Encryption Key (CEK) used to encrypt the digital content.
- information about the protocol to follow for setting up, and/or for using the secured communications channel. For example, this information may include information identifying the authentication method and/or encryption algorithm to be used.
- a seed that is to be provisioned to the other node participating in the secured communications session.

In some embodiments, the security data item may comprise a link to a license associated with the digital content. In such and other embodiments, the content encryption key may be retrievable from the license. The content encryption key may then be used to decrypt the security data item Additionally, the security data item may comprise:
- a content identifier (CID) identifying the digital content
- a link, e.g. in the form of a URL, to a license associated with the digital content.

Hence, the DRM agent may use the CID to look for a matching license in its license repository, and the DRM agent may use the link to execute a license download, if no matching license was found. This process may involve a user interaction.

Alternatively, the content identifier and/or the link to the license may be included in the metadata separately from the security data item.

The content encryption key may be retrieved from the license according to known DRM procedures.

Interesting features of some embodiments of the method described herein may be summarized as follows:
- A mixed PKI-PSK mechanism of establishing a SAC is used, where the SAC session keys and/or SAC session seeds are provisioned using a PKI-based DRM agent, and the SAC is set up using a PSK mechanism.
- The DRM agent receives a "SAC information package", i.e. a security data item including corresponding SAC session key and SAC session seed. The SAC information package is DRM protected. The session key may be confidentiality protected while the session seed may also be confidentiality protected or only be integrity protected.
- The DRM agent provisions the SAC session key towards one or more entity that it is connected to using a trusted interface (e.g. within a processing device.)
- The DRM agent provisions the SAC session seed towards one or more entity that it is connected to using an untrusted interface (e.g. a network interface.) In this case the entity receiving the SAC session seed may also need some other pre-established secret to derive the SAC session key
- Allowing control of the scope of the SAC by using permission/constraint parameters. For example, the SAC can be controlled to only be usable in a predetermined time interval and/or a predetermined number of times, and/or the like. Such permission/constraint parameters may be included in the security data item. Alternatively or additionally, such permission/constraint parameters may be included in a license related to the security data item. The permission/constraints may be used by the DRM agent to control when the CEK may be used for decrypting the security data item. In embodiments where the CEK is used to decrypt the SAC session key, indirect control of the scope of the SAC is achieved. In embodiments where the DRM agent is not the user of the SAC session key, the entity that uses the SAC session key may check that the usage follows the scope. Such control may, for example, be achieved by periodically enquiring the DRM agent about the status of the related license.

According to another aspect, described herein is a method for communicating digital content protected by a digital rights management protection mechanism to a first processing component; the method comprising
- establishing a secured communication channel between the first and a second processing component by performing the steps of the method for establishing a secured communication channel described herein;
- communicating digital content, e.g. digital content included in a container data item for communicating digital content, to the first processing component via the established secured communications channel.

For the purpose of the present description the term digital content is intended to comprise any one or more digital data items including e.g. computer-executable instructions and/or other types of computer-executable code, and/or any type of other information, e.g. text, an image, multimedia content, database content, operational parameters of the processing device, and/or the like. The term container data item for communicating digital content is intended to comprise any data item having a data structure suitable for communicating digital content, e.g. a data structure conforming to a data format recognised by a DRM system for communicating DRM protected digital content.

The present invention relates to different aspects including the methods and processing device described above and in the following, corresponding methods, apparatus, and computer programs, each of which may yield one or more of the benefits and advantages described in connection with the above-mentioned method and/or processing device, and each having one or more embodiments corresponding to the embodiments described in connection with the above-mentioned method and/or processing device.

The terms processing device and data processing device are intended to comprise any electronic device comprising processing means for data processing. In particular, the term processing device is intended to comprise any electronic equipment, consumer electronics device, portable radio communications equipment, and other handheld or portable devices, personal computers or other computers or data processing systems, set-top boxes, cable boxes, domestic gateways, etc.

The term portable radio communications equipment includes all equipment such as mobile terminals, e.g. mobile telephones, pagers, communicators, electronic organisers, smart phones, personal digital assistants (PDAs), handheld computers, or the like.

The secured communications channel may be based on any communications technology suitable for communication of digital data, e.g. a communications channel between software components executed on the same or different processing devices. The communications channel may use any suitable signal bearer, e.g. based on a wired or wireless communications medium.

It is noted that the features of the methods described herein may be implemented in software and carried out on a data processing device or other processing means caused by the execution of program code means such as computer-executable instructions. Here and in the following, the term processing means comprises any circuit and/or device suitably adapted to perform the above functions. In particular, the above term comprises general-or special-purpose programmable microprocessors, Digital Signal Processors (DSP), Application Specific Integrated Circuits (ASIC), Programmable Logic Arrays (PLA), Field Programmable Gate Arrays (FPGA), special purpose electronic circuits, etc., or a combination thereof.

Hence, according to another aspect, a computer program comprises program code means adapted to cause a data processing device to perform the steps of the method described herein, when said computer program is run on the data processing device. For example, the program code means may be loaded in a memory, such as a RAM (Random Access Memory), from a storage medium or from another computer via a computer network. Alternatively, the described features may be implemented by hardwired circuitry instead of software or in combination with software.

BRIEF DESCRIPTION OF THE DRAWINGS

The above and other aspects will be apparent and elucidated from the embodiments described with reference to the drawing in which.

DETAILED DESCRIPTION

Figure 1:
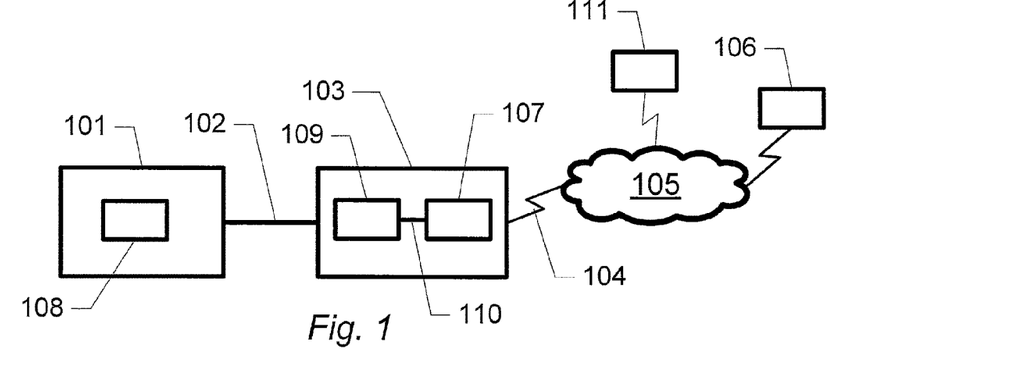
FIG. 1 shows a schematic block diagram of an embodiment of a system for distributing digital content.

FIG. 1 shows a schematic block diagram of an embodiment of a system for distributing digital content. The system comprises a first processing device 101 connected via a first communications interface 102 to a second processing device 103. The second processing device 103 may be a gateway of a domestic entertainment system, e.g. in the form of an application-specific hardware box, a suitably programmed computer, or the like. The first communications interface may be a local computer network, e.g. a LAN, WLAN, or any other suitable computer network, a telecommunications network, and/or the like. The first processing device 101 may be any processing device suitable for presenting a digital content, e.g. a suitable programmed stationary or portable computer, a handheld device such as a mobile telephone, media player, etc. The second processing device 103 further comprises a second communications interface 104, e.g. a network interface circuit or another suitable interface for connecting the second processing device with a computer network 105, e.g. the Internet, a telecommunications network, and/or the like.

Hence, the second processing device 103 may receive digital content from a digital content provider system 106 via the computer network 105. The received digital content may be protected or unprotected. The second processing device may then distribute the received digital content to the first processing device 101 where the digital content may be presented to a user or otherwise processed. To this end, the first processing device 101 comprises a first processing component 108 for processing the digital content, e.g. a software component executed by a programmable processing unit of the first processing device, or a hardware circuitry configured to process digital content. For example, the first processing component may be a software application for processing and presenting media such as a media player, a video player, an audio player, a rendering application, a picture viewer, and/or the like. Alternatively or additionally, the first processing component may include an execution environment for executing received software, or the like.

The second processing device 103 comprises a DRM agent 107 for enforcing permissions to received digital content and for decrypting the digital content if the permissions/constraints so allow, and a second processing component 109 for distributing received digital content. In the example of FIG. 1, the DRM agent 107 and the second processing component 109 are shown as two separate components connected by an internal interface 110. For example the DRM agent and the second processing component may be respective software applications executed by a programmable processing unit of the second processing device and communicating with each other via a suitable inter-process communication mechanism, via shared memory, via suitable input-output files or streams, or via any other suitable mechanism. Alternatively, the DRM agent and/or the second processing component may be implemented fully or in part as a hardware component. It will be appreciated, however, that in alternative embodiments the DRM agent and the second processing component may be implemented as a single processing component instead.

The DRM agent may be a software component implemented in accordance with any suitable DRM system, e.g. Windows media DRM, OMA DRM, etc. The first processing component 108 and the second processing component 109 communicate via the communications interface 102. As will be described in greater detail below, the first processing component 108 and the second processing component 109 establish a secure authenticated channel via interface 102.

The system further comprises a rights issuer system 111, e.g. in the form of a web server or other data processing system connected to computer network 105. The rights issuer system provides digital licenses for download, normally subject to a suitable authentication and authorisation of the recipient of the license.

Even though not explicitly shown in FIG. 1, it will be appreciated that the second processing device may receive digital content from more than one content provider and/or distribute received digital content to additional processing devices in addition to the first processing device.

Figure 2:
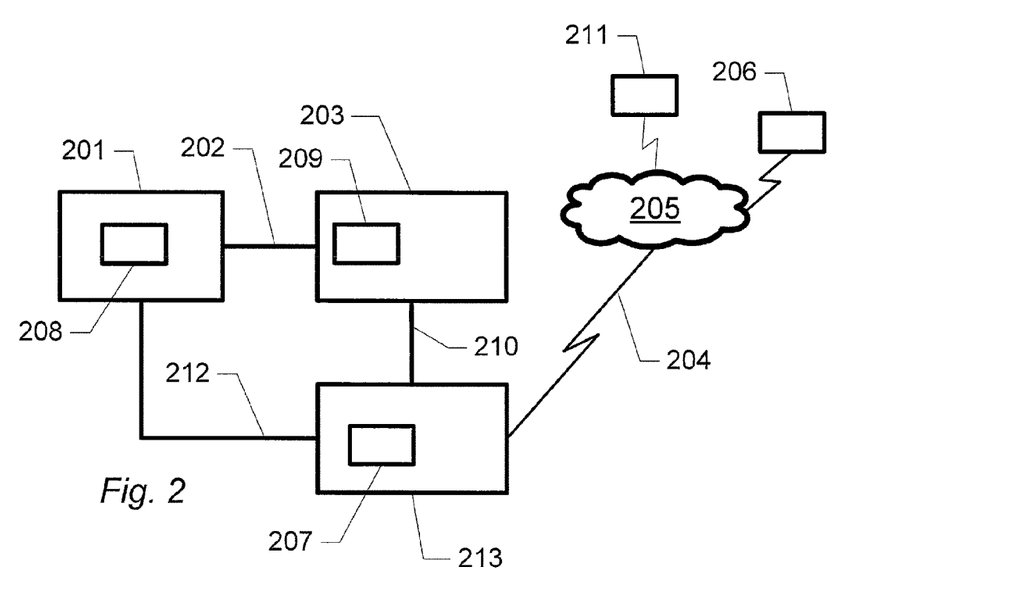
FIG. 2 shows a schematic block diagram of another embodiment of a system for distributing digital content.

FIG. 2 shows a schematic block diagram of another embodiment of a system for distributing digital content. The embodiment of FIG. 2 is similar to the system described in connection with FIG. 1 but where the DRM agent 207 and the second processing component 209 are implemented on different processing devices 213 and 203, respectively.

Hence, the system of FIG. 2 comprises a first processing device 201 connected via a first communications interface 202 to a second processing device 203. The first processing device 201 comprises a first processing component 208 for processing the digital content, e.g. a software component executed by a programmable processing unit of the first processing device, or a hardware circuitry configured to process digital content. The second processing device 203 comprises a second processing component 209 for distributing received digital content, and the first processing component 208 and the second processing component 209 communicate via the communications interface 202 and establish a secure authenticated channel via interface 202, all as described in connection with FIG. 1.

The system of FIG. 2 further comprises a third processing device 213, e.g. a gateway of a domestic entertainment system, e.g. in the form of an application-specific hardware box, a suitably programmed computer, or the like. The third processing device 213 further comprises a second communications interface 204, e.g. a network interface circuit or another suitable interface for connecting the third processing device with a computer network 205, e.g. the internet, a telecommunications network, and/or the like. Alternatively, the Interface 204 may also be connected to the second processing device 203.

The third processing device 213 comprises a DRM agent 207 for enforcing permissions to received digital content.

The third processing device is connected to the second processing device via communications interface 210 and, optionally, to the first processing device 201 via communications interface 212. For example communications interface 210 may be a local computer network, e.g. a LAN, WLAN, or any other suitable computer network, a telecommunications network, and/or the like. The communications interface 210 may be implemented over the same or a different network as communications interface 202. Similarly, communications interface 212 may be implemented over the same or a different network as communications interface 210.

The system further comprises a rights issuer system 211 and a digital content provider system 206, all as described in connection with FIG. 1.

Two embodiments of uses of a system as described in FIG. 1 including DRM assisted SAC setup will now be described with reference to FIGS. 3 and 4, and FIGS. 5 and 6, respectively. The example described with reference to FIGS. 3 and 4 relates to an embodiment where a download agent is executed on the same device as the DRM agent, while the example described with reference to FIGS. 5 and 6 relates to an embodiment where a download agent is executed on the first processing device.

Figure 3:
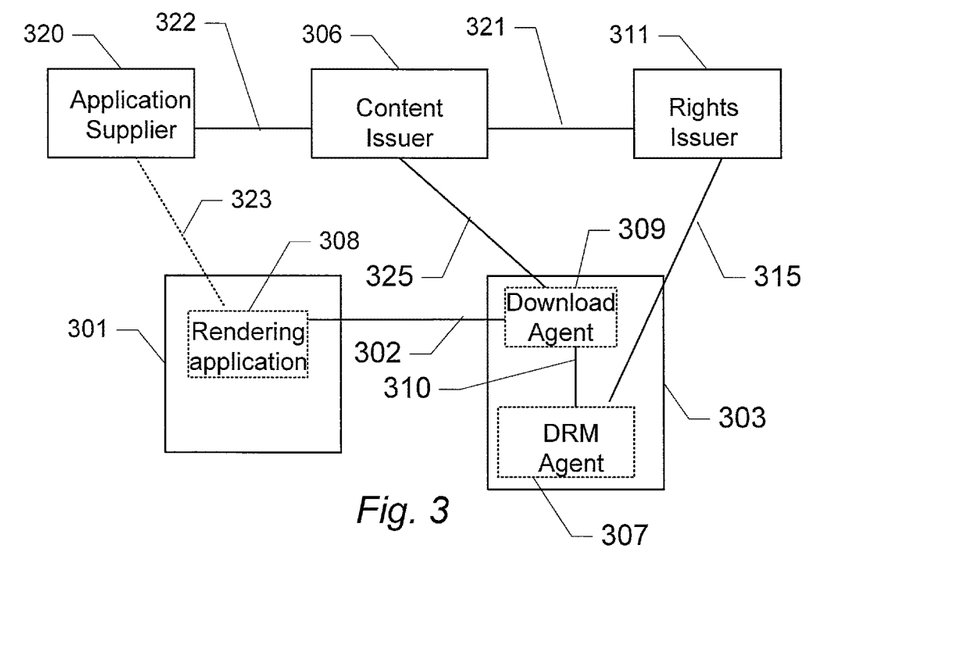
FIG. 3 shows a schematic block diagram of an embodiment of a system for distributing digital content.

FIG. 3 shows a schematic block diagram of an embodiment of a system for distributing digital content. The system comprises a first processing device 301 and a second processing device 303 as described in connection with FIG. 1. The first processing device executes a first processing component in the form of a rendering application 308. It will be appreciated that the method described herein may also be implemented with a different type of processing component for processing digital content. The second processing device 303 executes a DRM agent 307 and a second processing component in the form of a download agent 309. The system further comprises a content issuer system 306, e.g. in the form of a web server or other data processing system connected to a suitable computer network (not explicitly shown in FIG. 3). The content issuer system provides digital content to the second processing device, e.g. in the form of downloadable files or media streams which the second processing device may receive via the internet or another suitable computer network. The system further comprises a rights issuer system 311, e.g. in the form of a web server or other data processing system connected to a suitable computer network. The rights issuer system provides digital licenses for download, normally subject to a suitable authentication and authorisation of the recipient of the license.

The system further comprises an application supplier 320 supplying the rendering application 308.

In the system of FIG. 3, the Download agent 309 is responsible for setting up and using a SAC 302 towards the Rendering application 308. The SAC may e.g. be established via a local area network or another suitable communications interface between the first and second processing devices. During the setting up of the SAC, the download agent 309 interacts with the DRM agent 307 so as to get access to a SAC session key for setting up a secured SAC session, to get access to the plaintext digital content to be transported over the SAC (after being encrypted with the SAC session key), etc.

Figure 4:
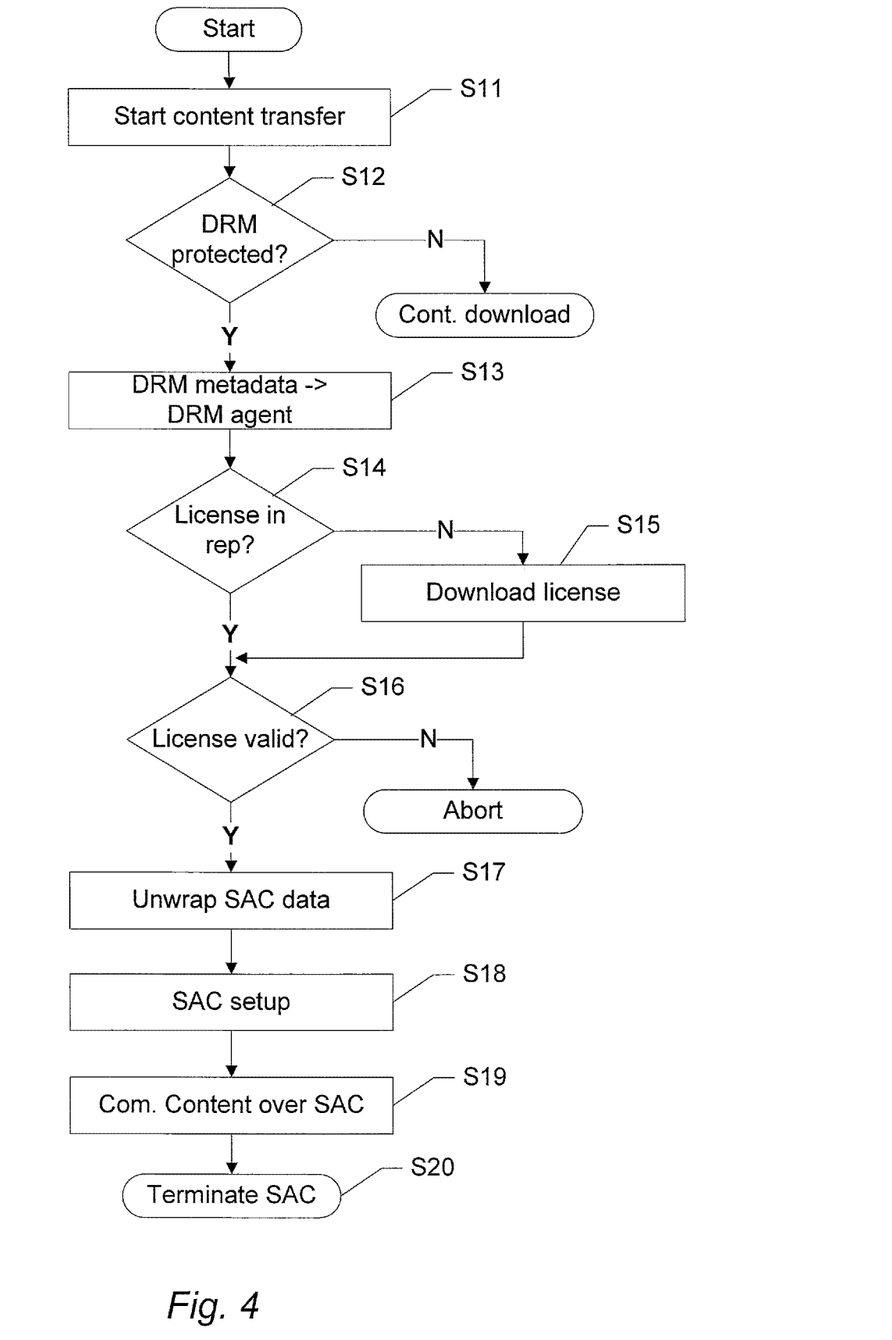
FIG. 4 shows a flow diagram of an embodiment of a process for distributing digital content by the system of FIG. 3 including establishing a secured communications channel.

Referring to FIG. 4 and with continued reference to FIG. 3, a process of setting up the SAC and distributing digital content will now be described in greater detail.

In initial step S11, the download agent 309 of the second processing device sets up and starts a content transfer of digital content from the Content Issuer system 306 over a suitable communication channel 325, e.g. via a computer network such as the internet. The download agent may start the content transfer upon a request from a different application, typically from the Rendering application 308. The download agent may receive the digital content included in a suitable container data item that includes the digital content and optional additional data such as metadata. In subsequent step S12, the download agent detects by a suitable detection mechanism whether the digital content is protected by a DRM mechanism. This could e.g. be that the MIME type of the transferred data indicates DRM protection, or that it is indicated by some plaintext data embedded in the content, which is read by the Download agent. If the content is not protected, the process proceeds by downloading and distributing the digital content without protection and without setting up of a SAC. If the download agent has detected DRM protection of the digital content, the process proceeds at step S13, wherein the download agent provides the DRM agent 307 via device-internal communications channel 310 with at least a data container, or another suitable security data item, embedded in the received digital content that holds DRM specific metadata. The DRM specific metadata includes at least:
- a Content ID (CID), that the DRM agent uses to look for a matching license in its license repository (not explicitly shown),
- a License URL, that the DRM agent uses to execute a license download if no matching license was found (possibly involving user interaction, etc),
- a SAC session key, encrypted by the Content Encryption Key (CEK),—information about the protocol to follow for setting up, and using, the SAC (e.g. authentication method, encryption algorithm),
- a SAC seed, that is to be provisioned to the other node participating in the SAC session.

In step S14, the DRM agent searches for a license associated with the CID in its internal license repository. If the DRM agent does not find a matching license in its repository, the process proceeds at step S15, where the DRM agent uses the license URL to initiate a license download from a rights issuer system 311 via a suitable communications channel 315, e.g. a suitable computer network such as the Internet. This download may require consent, and possibly payment procedures, involving the user.

Once the DRM agent has obtained the associated license, the process proceeds at step S16 where the DRM agent validates the license using a suitable DRM license validation mechanism, e.g. including checking the permissions and constraints specified in the license, e.g. whether the content can be printed (in addition to being displayed on the screen), whether the content can be played a second time, whether the validity period has passed, etc., and/or the like. This evaluation may include the processing of a suitable Rights Expression Language (REL). Additionally, in some embodiments, prior to this processing, the integrity of the license may be checked, i.e. that it has not been tampered with. Whether this is desirable may depend on how the license is stored (e.g. in secure storage or common storage). Such a check may involve an evaluation of a digital signature, which then typically would involve PKI credentials. If this validation fails, the process aborts the download operation.

Once the DRM agent has obtained and verified the associated license, the process proceeds at step S17 where the DRM agent unwraps an encrypted content encryption key (CEK) from the obtained license, and then unwraps the protected SAC session key with the use of the CEK. Again the details of the decryption method depend on the details of the DRM system, e.g. as described in OMA DRM v2 available at http://www.openmobilealliance.org/Technical/release_program/drm_v2_1.asp x. The received DRM container holding the above data may further include integrity protection data, e.g. a tag of a message authentication code. In such cases, the DRM agent may further validate the integrity protection data. If no security checks or license validation have failed, the DRM agent then returns the plaintext SAC session key, the SAC protocol information, the CID, and the SAC seed to the Download agent.

In subsequent step S18, based on the above information received from the DRM agent about the SAC, the Download agent initiates the setup of a SAC 302 towards the Rendering application. To this end, the download agent initially provides the Rendering application with the SAC protocol information, the CID, and the SAC seed. In some embodiments, this step involves a negotiation, if several protocols are mentioned in the information.

It will be appreciated that the download agent may obtain the address of the Rendering application in a variety of ways. For example, the download agent may have received the download request from the Rendering application, and thus have obtained a reference to it. The SAC protocol can be of any type that securely achieves authentication and confidentiality, e.g. using a well-known challenge response authentication protocol.

After setup of the SAC, in subsequent step S19, the SAC is used to transport the received digital content from the Download agent to the Rendering Server. To this end, the Download agent first requests the DRM agent to decrypt the protected digital content using the CEK. Conditioned on a successful license validation by the DRM agent as described above, the DRM agent decrypts the received digital content. The Download agent then uses the SAC session key to encrypt the decrypted digital content and sends the encrypted digital content over the SAC 302 to the rendering application 308. When the complete digital content is transmitted to the Rendering application, in subsequent step S20, the process terminates the SAC 302, and both the Download agent and the Rendering application perform clean up by securely deleting the SAC session key, etc.

It will be appreciated that additional steps may be required to be performed at some point and involving additional communications channels, in order for the SAC setup to succeed. However, the information passed over these channels are not bound in time to a specific SAC session, and the steps may normally only be required to be executed once, at any time before the first SAC session.

For example, the Rendering application may be provisioned with information regarding the shared secret (i.e. the SAC session key) in order to be able to generate the SAC session key based on the data received during step S18 from the Download agent. In the example of FIG. 3, this information is shown to be provided from an Application supplier 320 that has supplied the rendering application via a communications channel 323, e.g. the internet or another suitable computer network and/or a suitable out-of-band communications channel. This may be done in many ways. For example, the Application supplier may build the necessary information into the Rendering application before it was installed into the processing device 301. In order to secure the information about the shared secret in the rendering application, known obfuscation techniques may be used. For example, white box cryptography may be used to secure the secret information when the rendering application is supplied as a downloadable application from a website. Another way of providing the information about the shared secret to the rendering application may involve using a suitable out-of-band mechanism such as mail, SMS, etc. to deliver the information to the user who can then enter it into the rendering device. Yet another way is to re-use an existing security infrastructure if available, e.g. if the Application supplier is a mobile operator and the rendering device has a SIM. In such a situation a secret derived from the SIM credential can be used. In yet another embodiment, the processing device 301 also includes a DRM agent, and the processing device 301 receives the SAC session key via this DRM agent in the same way as processing device 303 receives the SAC session key, i.e. as described above.

Furthermore information about what SAC and key exchange protocols the Rendering application supports may need to be communicated to the Content Issuer system 306, as illustrated by communications channel 322 in FIG. 3. The content issuer system 306 may then use this information to prepare the DRM metadata in the protected content container so that the SAC can be successfully set up between the Rendering application and the Download agent, as described above. This information may be communicated to the content provider system by any suitable means. The Content Issuer 306 may also have to communicate information to the Rights Issuer 311, e.g. information about the CEK, the CID, and other data that it may need so as to be able to generate the associated license. This communication is illustrated by communications channel 321 in FIG. 3.

In a variant of the embodiment described in FIGS. 3 and 4, the DRM agent may not communicate the SAC session key to the Download agent, but instead assist the Download agent in all operations requiring the SAC session key. This improves the overall security, as the Download agent will not directly access the SAC session key.

In another variant, the SAC seed does not exist, and the SAC session key already exists at the Rendering application. For example, a number of SAC session keys may be pre-installed during manufacturing of the rendering application, and hence do not have to be generated from a seed. The SAC session key to be used for a specific content may then be identified by the CID. In yet another variant, the key provisioned in the DRM metadata to the DRM agent is not the SAC session key, but a key used to authenticate and negotiate/exchange a SAC session key with the other node. This is especially useful when the seed is not used, as otherwise the same SAC key may be used across multiple sessions (e.g. when the content is rendered multiple times). It will be appreciated that, in some embodiments, more than one session key may be transferred.

Figure 5:
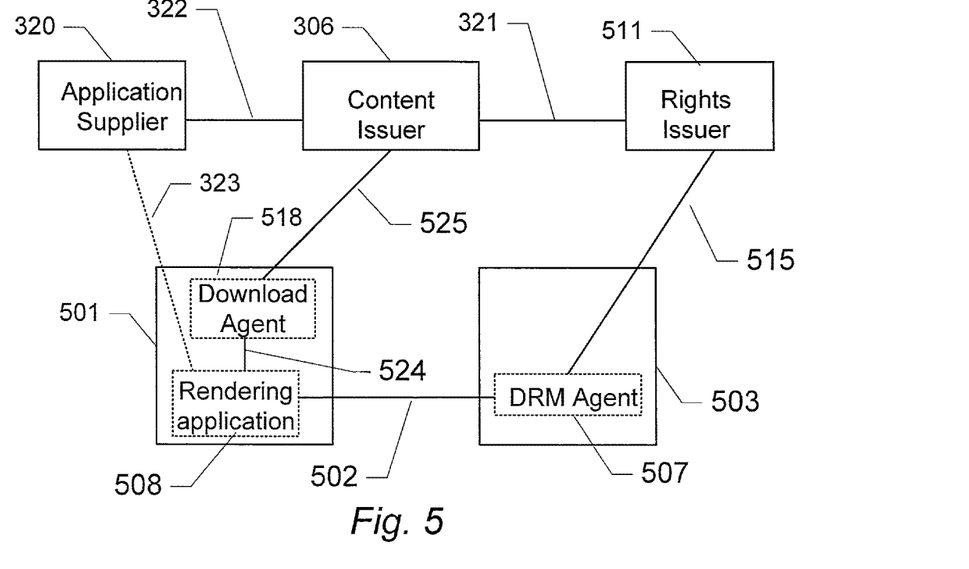
FIG. 5 shows a schematic block diagram of an embodiment of a system for distributing digital content.
Figure 6:
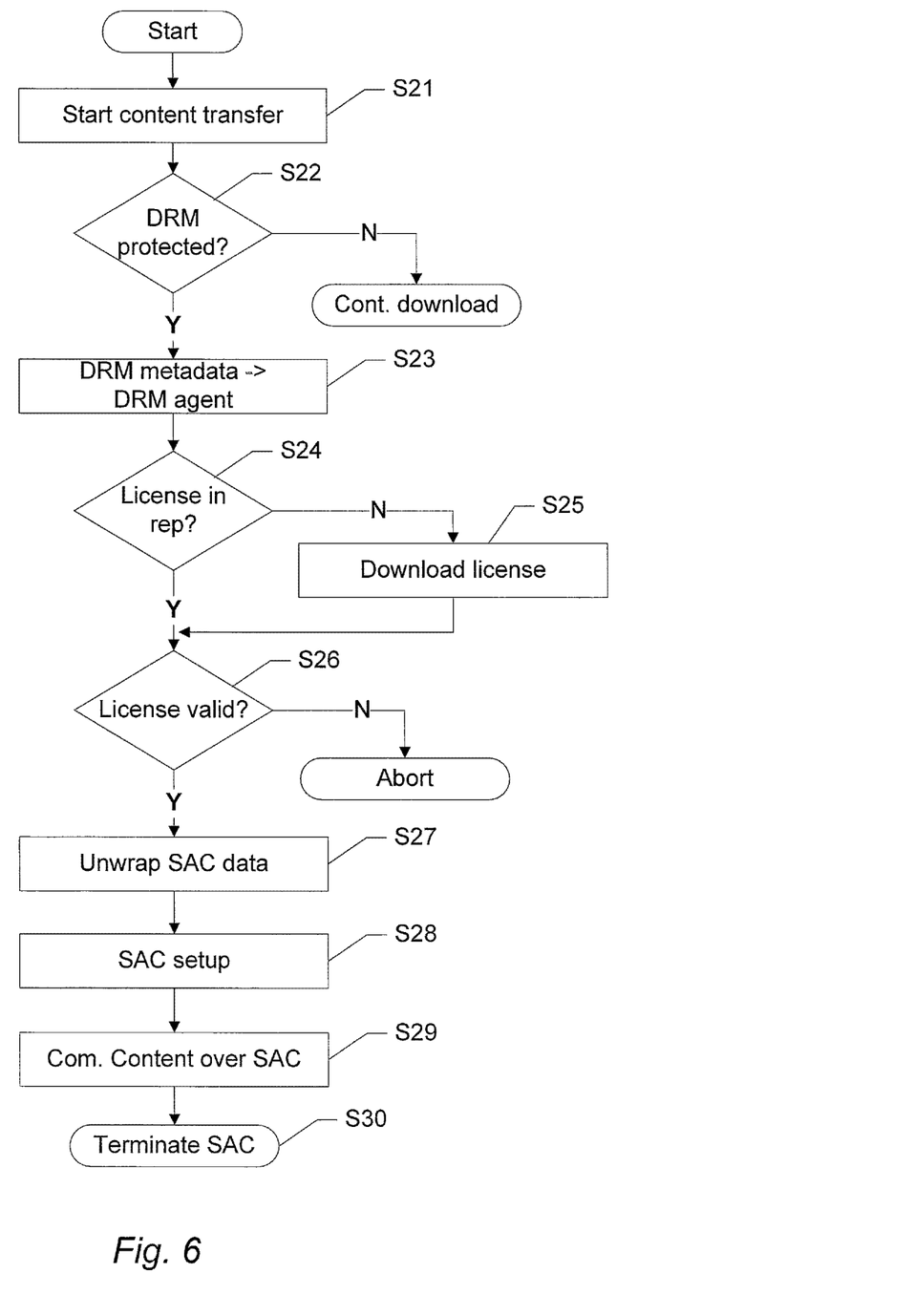
FIG. 6 shows a flow diagram of an embodiment of a process for distributing digital content by the system of FIG. 5 including establishing a secured communications channel.

FIG. 5 shows a schematic block diagram of another embodiment of a system for distributing digital content, and FIG. 6 shows a flow diagram of an embodiment of a process for distributing digital content by the system of FIG. 5 including establishing a secured communications channel. The embodiment shown in FIGS. 5 and 6 is similar to the embodiment shown in FIGS. 3 and 4. Therefore, in the following, only the differences between these embodiments will be described.

Generally, in the embodiment of FIGS. 5 and 6, the role of the Download agent 518 is only to provision the Rendering application 508 with the protected content, and the Rendering application is responsible for setting up and using the SAC 502 towards the DRM agent 507. Hence, in this embodiment, the rendering application includes the first processing component and the DRM agent includes the second processing component between which the SAC is established. Furthermore, in this embodiment, the Download agent is executed on the first processing device 501, i.e. on the same processing device as the Rendering agent 508. Hence, the download agent is not involved in the operations of setting up or running the SAC.

The remaining tasks of the download agent are then reduced to downloading the protected digital content via communication channel 525 (step S21), e.g. the internet or another suitable computer network, and to pass the protected digital content on to the Rendering application 508 via a suitable device-internal interface 524.

Upon receipt of this data the Rendering application detects (step S22) whether the received digital content is DRM protected, e.g. by the mechanisms described in connection with FIGS. 3 and 4. If the rendering application detects receipt of DRM protected content, the rendering application initiates the setting up of a SAC 502 towards the DRM agent 507 in processing device 503. The Rendering application may obtain a reference to /address of the DRM agent in a variety of ways. For example, the processing device 503 may be a home network gateway, known by all processing devices in the home network.

Accordingly, in step S23, the Rendering application first supplies the DRM agent with at least the data container that is embedded in the digital content and holds the DRM specific metadata, i.e. the same data as the Download agent provided to the DRM agent in the embodiment of FIGS. 3-4. The rendering application may communicate the data container over the same communications interface which is used to establish the SAC, e.g. interface 502 of FIG. 1. Based on the received data, the DRM agent then locates (S24) and/or downloads (S25) the associated license from the rights issuer system 511 via communications channel 515, validates the license (S26), unwraps and decrypts the SAC session key (S27), etc as described in connection with the embodiment of FIGS. 3-4. Based on this data, the DRM agent then initiates the SAC setup towards the Rendering application (S28), just as the Download agent did in the embodiment of FIGS. 3-4. When the SAC is set up, the Rendering application can start to send protected content to the DRM agent, which will decrypt (on condition that the license is valid) the content using the CEK and return it over the SAC (after encrypting it with the SAC session key) (step S29). When the rendering session is finished, the SAC session is terminated (S30), and both ends of the SAC session clean up, securely deleting the SAC session key, etc.

The embodiment of FIGS. 5 and 6 is particularly useful if, e.g., the SAC is used to transmit DRM protected content from the processing device 503 to processing device 501. In this case, the DRM agent on processing device 503 can check and enforce the rights of the content in order to release it in a protected way to the rendering application on processing device 501 subject to the license on processing device 503. This way, processing device 501 has access to protected content without the necessity of installing a DRM agent on processing device 501. Even if a DRM agent is present on processing device 501, rights enforcement on processing device 503 may be desirable, e.g., for stateful rights objects on processing device 503 that can not (easily) be transferred to processing device 501.

Although some embodiments have been described and shown in detail, the invention is not restricted to them, but may also be embodied in other ways within the scope of the subject matter defined in the following claims.

Any of the embodiments described herein can be used for streaming type protected content and/or for file download type of protected content. The described solution is also applicable for the case when there is only one device involved, i.e. when the first and second processing devices are embedded as a single device. The entities discussed in this context that are located inside the same device do not have to be separate entities, but can just as well be integrated into one entity, containing the described functionality. Also, the nodes Application supplier, Content Issuer, and Rights Issuer do not have to be separate nodes, but can be integrated into fewer nodes, containing the described functionality.

The methods and devices described herein have mainly been disclosed in the context of rendering media. In particular, the two embodiments described in connection with FIGS. 3-4 and FIGS. 5-6 both involve the rendering of protected content as the actual usage of the SAC channel. However, it will be appreciated that other scenarios may be possible where the data transported over the SAC is not related to a DRM context. Examples of this may include the use of a SAC between a sensor and a data-collecting device. In this context, a SAC could be used to prevent interference (e.g. from a same kind of sensor in a neighbour's home). Further examples may include applications where one device makes use of another device's secret credential, e.g. a SIM in a mobile phone or in an IMS Gateway.

In such applications the Rendering application in FIGS. 3-6 would then be replaced by another application suitable in the given context. In such an application a DRM protected "dummy" file may be downloaded and contain metadata that is used for setting up the SAC, but the dummy file would not contain any DRM protected content data, i.e. the container data item for communicating digital content is only used as a container to transport and validate the security data for setting up the SAC. Instead the "non-DRM related" data would be sent over the SAC. In such an application, the DRM agent may need to be informed that it should behave differently from the standard "DRM context" cases, and deliver/receive the data streamed over the SAC to/from some other application in the device. This information may be signalled to the DRM agent in the meta data fields of the protected "dummy" file. In the embodiment of FIGS. 3-4, the device 301 may then have to trigger device 303 to download the dummy file by providing it with a link, or other reference, if device 301 is the initiator of the interaction.

The method, product means, and device described herein can be implemented by means of hardware comprising several distinct elements, and/or partly or completely by means of a suitably programmed microprocessor. In the device claims enumerating several means, several of these means can be embodied by one and the same item of hardware, e.g. a suitably programmed microprocessor, one or more digital signal processor, or the like. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, integers, steps or components but does not preclude the presence or addition of one or more other features, integers, steps, components or groups thereof.

The invention claimed is:

1. A method for establishing a secured communication channel between a first processing component and a second processing component; the method comprising:
    executing a digital rights management agent on a processing unit, the digital rights management agent being configured to enforce permissions and/or constraints associated with digital content based on a digital rights management protection mechanism;
    receiving, by the digital rights management agent at least a security data item, the security data item including a secure authenticated channel (SAC) session key data item;
    verifying authenticity of the received SAC session key data item by the digital rights management agent using said digital rights management protection mechanism;
    providing the verified SAC session key data item by the digital rights management agent to at least the second processing component; and
    establishing a secured communication channel between the first and second processing components using at least the provided SAC session key data item.

2. A method according to claim 1, wherein providing the verified SAC session key by the digital rights management agent to at least the second processing component is conditioned on a successful validation of a set of permissions and/or constraints specified in a license data item associated with the received security data item.

3. A method according to claim 1, wherein the digital rights management agent is connected to the second processing component via a trusted interface.

4. A method according to claim 1, wherein the security data item including the SAC session key data item is included as DRM metadata in a container data item for communicating digital content.

5. A method according to claim 4, wherein the SAC session key data item included in the DRM metadata is an intermediate key used to authenticate, negotiate and exchange a SAC session key between the first processing component and the second processing component.

6. A method according to claim 1, wherein the SAC session key data item includes at least one of a session key and a session seed data item from which a session key is generatable by at least one of the first and second processing components.

7. A method according to claim 1, wherein the security data item further includes information about how to set up the secure communications channel.

8. A method according to claim 1, wherein the security data item further comprises a session seed data item allowing the first processing component to generate a session key corresponding to the received and verified session key, and the method comprises communicating the session seed to the first processing component.

9. A method according to claim 8, wherein the security data item comprises:
    a session key;
    information about a protocol to follow for setting up the secured communications channel; and
    the session seed data item.

10. A method according to claim 9, wherein the security data item comprises a link to a license associated with the digital content; and wherein the content encryption key is retrievable from the license.

11. A method for communicating digital content protected by a digital rights management protection mechanism to at least a first processing component; the method comprising:
    establishing a secured communication channel between the first and a second processing component by performing the steps of the method defined in claim 1; and
    communicating digital content to the first processing component via the established secured communications channel.

12. A processing device configured to perform the steps of the method defined in claim 1, wherein the processing device comprises a processing unit configured to execute the digital rights management agent, and a first communications interface for receiving at least the security data item.

13. A processing device according to claim 12, wherein the processing device comprises the second processing component.

14. A processing device according to claim 12, wherein the first communications interface is configured to receive a container data item for communicating digital content from a content provider system, the container data item comprising at least the security data item.

15. A processing device according to claim 12, wherein the processing device comprises a second communications interface for communicating data with another processing device, and wherein the processing device is adapted to establish the secured communications channel with the another processing device via said second communications interface.

16. A non-transitory computer readable medium storing program code means that, when executed, perform the method according to claim 1, when said program code means are executed on a data processing device.

17. A method according to claim 1, further comprising:
executing a download agent on the processing unit, wherein the download agent is responsible for setting up and using the SAC session key data item toward at least the second processing component.

18. A method according to claim 1, further comprising:
executing a download agent on the processing unit, wherein the download agent is responsible for provisioning at least the second processing component with protected content including a SAC session key data item, and wherein at least the second processing component is responsible for setting up and using the SAC session key data item toward the digital rights management agent on the first processing component.

19. A method according to claim 1, wherein the protocol used in setting up the SAC session key data item is a challenge and response authentication protocol.

20. A method according to claim 11, wherein after communicating digital content via the established secured communications channel is complete, the secure authenticated channel (SAC) is terminated and cleanup is performed by securely deleting the SAC session key data item.

* * * * *